US008669735B2

(12) United States Patent
Kim et al.

(10) Patent No.: US 8,669,735 B2
(45) Date of Patent: Mar. 11, 2014

(54) IMAGE DISPLAY APPARATUS HAVING FUNCTION OF CHARGING EXTERNAL DEVICE AND CHARGING METHOD THEREOF

(75) Inventors: Young-keun Kim, Suwon-si (KR); Young-joong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 507 days.

(21) Appl. No.: 12/569,162

(22) Filed: Sep. 29, 2009

(65) Prior Publication Data
US 2010/0097030 A1    Apr. 22, 2010

(30) Foreign Application Priority Data
Oct. 20, 2008 (KR) .................. 10-2008-0102604

(51) Int. Cl.
*H02J 7/00* (2006.01)
*H04B 1/18* (2006.01)
(52) U.S. Cl.
USPC ........... 320/106; 320/107; 320/110; 320/125; 320/138; 455/189.1
(58) Field of Classification Search
USPC ........................................................ 320/106
See application file for complete search history.

(56) References Cited

U.S. PATENT DOCUMENTS

| 6,456,036 | B1 * | 9/2002 | Thandiwe | 320/106 |
| 2002/0145403 | A1 * | 10/2002 | Wang et al. | 320/107 |
| 2005/0267999 | A1 | 12/2005 | Suematsu et al. | |
| 2006/0035527 | A1 * | 2/2006 | Numano | 439/668 |
| 2007/0103115 | A1 | 5/2007 | Liu | |

FOREIGN PATENT DOCUMENTS

EP    1691252 A1    8/2006

OTHER PUBLICATIONS

Extended European Search Report, dated Oct. 23, 2012, issued by the European Patent Office in counterpart European Patent Application No. 09169515.5.

* cited by examiner

*Primary Examiner* — Yalkew Fantu
(74) *Attorney, Agent, or Firm* — Sughrue Mion, PLLC

(57) ABSTRACT

An image display apparatus having a function of charging an external device and a charging method thereof are provide. The image display apparatus includes a universal serial bus (USB) interface which is connected to an external device through a power supply line and a data transmission line, and a main controller which, if the external device is connected, activates one of the power supply line and the data transmission line according to a type of the external device. Accordingly, the image display apparatus controls a USB terminal to selectively perform a charging operation or a data transmission operation.

13 Claims, 4 Drawing Sheets

IMAGE DISPLAY APPARATUS HAVING FUNCTION OF CHARGING EXTERNAL DEVICE AND CHARGING METHOD THEREOF

CROSS-REFERENCE TO RELATED APPLICATIONS

This application claims priority from Korean Patent Application No. 10-2008-102604, filed on Oct. 20, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to an image display apparatus having a function of charging an external device and a charging method thereof, and more particularly, to an image display apparatus having a function of charging an external device, which is capable of selectively performing a charging function or a data transmission function according to the type of external device, and a charging method thereof.

2. Description of the Related Art

A universal serial bus (USB) connection terminal is mainly provided on an apparatus such as a computer. Recently, the USB connection terminal is provided on a television (TV) to provide functions of reading and reproducing contents stored in a USB memory.

It is general that a TV provided with the USB connection terminal simply reads and reproduces contents stored in a USB memory connected to the USB connection terminal.

As an improvement on these functions of reading and reproducing contents stored in the USB memory, a configuration has been developed that can supply a power for operating the TV to a device connected to the USB connection terminal, thereby charging the device connected to the USB connection terminal.

A conventional TV capable of charging a device connected to the USB connection terminal using a power for operating the TV has an advantage that it does not require an extra charging apparatus and power supply connection.

However, the conventional TV capable of charging the device connected to the USB connection terminal has disadvantages that it cannot determine whether the device has been completely charged or not and also it cannot control any over current due to disability to control the USB connection terminal through a controller of the TV.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary aspects of the present invention provide an image display apparatus having a function of charging an external device, which is capable of selectively activating a power supply line or a data transmission line through a USB interface of the image display apparatus, thereby performing an appropriate operation according to the type of external device, and a charging method thereof.

Consistent with an aspect of the present invention, an image display apparatus with a function of charging an external device comprises a universal serial bus (USB) interface which is connected to an external device through a power supply line and a data transmission line, and a main controller which, if the external device is connected, activates one of the power supply line and the data transmission line according to a type of the external device.

The image display apparatus may further comprise a USB controller which determines the type of the external device according to whether descript information is received from the external device.

If descript information is received from the external device, the main controller may activate the data transmission line, and if the descript information is not received, the main controller may activate the power supply line.

The main controller may comprise a control module which activates one of the power supply line and the data transmission line, and a USB reception module which, if the data transmission line is activated by the control module, receives data from the external device.

The USB controller may comprise a USB module which detects whether a power supplied to the external device exceeds a threshold value, and a USB charging module which detects whether charging of the external device is completed after the power supply line is activated.

If completion of the charging operation for the external device is detected or if the power supplied to the external device exceeds the threshold value, the main controller may interrupt the power supply line.

If the power transmission line is activated in a standby mode and if completion of the charging operation for the external device is detected, the main controller may convert a current mode into a broadcast view mode or the standby mode selectively.

The image display apparatus may be a television (TV) having a tuner.

Consistent with an aspect of the present invention, a method for charging an external device of an image display apparatus which is connected to the external device through a USB interface, the method comprising, if the external device is connected, determining a mode according to a type of the external device, and if a charging mode is determined, activating a power supply line to charge the external device, and if a data transmission mode is determined, activating a data transmission line.

The method may further comprise detecting connection of the external device at the USB interface.

The mode determining step may determine the data transmission mode if descript information is received from the external device, and may determine the charging mode if the descript information is not received.

The method may further comprise receiving data from the external device if the data transmission line is activated.

The method may further comprise, if the power supply line is activated, detecting whether a power supplied to the external device exceeds a threshold value and whether charging of the external device is completed.

The method may further comprise, if completion of the charging operation for the external device is detected or if the power supplied to the external device exceeds the threshold value, interrupting the power supply line.

The method may further comprise, if the power supply line is activated in a standby mode and if completion of the charging operation for the external device is detected, converting a current mode into a broadcast view mode or the standby mode selectively.

The image display apparatus may be a TV having a tuner.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
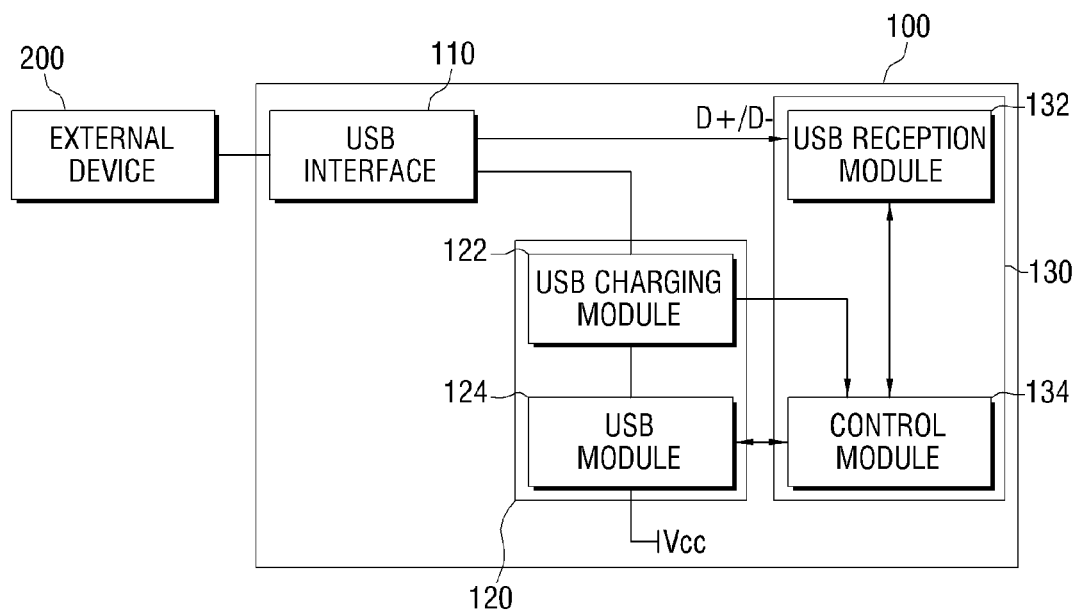
FIG. 1 is a block diagram of an image display apparatus consistent with an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram of an image display apparatus according to an exemplary embodiment of the present invention.

Referring to FIG. 1, an image display apparatus 100 comprises a USB interface 110, a USB controller 120, and a main controller 130.

An external device 200 may be connected to the image display apparatus 100.

The image display apparatus 100 may be a TV that includes a tuner (not shown) capable of receiving broadcast signals. Also, the external device 200 connected to the image display apparatus 100 refers to all of the devices that include a USB memory device and are connectible through a USB cable. For example, the external device 200 may be an MP3 player and a mobile game console having a USB connection terminal.

The USB interface 110, which supports interface between the image display apparatus 100 and the external device 200, detects connection if the external device 200 is connected to the image display apparatus 100.

The USB interface 110 is connected to the external device 200 through a power supply line and a data transmission line. Herein, the power supply line is adapted to supply a power of the image display apparatus 100 to the external device 200, and the data transmission line is adapted to transmit data from the external device 200 to the image display apparatus 100.

The USB controller 120 determines the type of external device 200 according to whether descript information is received from the external device 200 or not. When being connected to a certain device including the image display apparatus 100, a general USB memory device transmits its own device information to the device connected thereto. The descript information corresponds to this device information.

The USB controller 120 comprises a USB charging module 122 to detect whether charging of the external device 200 is completed and a USB module 124 to monitor power supply to the external device 200.

The USB charging module 122 detects whether charging of the external device 200 is completed after the power supply line is activated. If the charging of the external device 200 is completed, the USB charging module 122 informs the main controller 130 that the charging operation is completed to stop the charging operation. The USB charging module 122 corresponds to a general USB charging integrated circuit (IC). In an exemplary embodiment, a rechargeable power supply unit of the external device 200 is charged. In another exemplary embodiment, the power supply unit may be a rechargeable battery.

The USB module 124 detects whether a power supplied to the external device 100 exceeds a threshold value. According to regulations related to USB, current flowing through the USB should range from 100 mA to 500 mA. Accordingly, the USB module 124 functions to monitor whether the power supplied to the external device 200 is within the range of the regulation.

If the power supplied to the external device 200 exceeds a threshold, the USB module 124 informs the main controller 130 of this to stop the power supply. Accordingly, over current can be prevented. The USB module 124 corresponds to a general USB IC.

If the USB interface 110 detects connection with the external device 200, the USB module 124 determines the type of external device 200 according to whether descript information is received from the external device 200.

More specifically, if the external device 200 is a USB memory device, the external device 200 transmits descript information to the image display apparatus 100, and, if the external device 200 is not a USB memory device, the external device 200 does not transmit descript information to the image display apparatus 100.

Accordingly, if the descript information is received, the USB module 124 determines that the external device 200 is a USB memory device. Also, if descript information is not received despite connection with the external device 200, the USB module 124 determines that the external device 200 is a different device other than the USB memory device.

Also, the USB module 124 determines a mode of the image display apparatus 100 according to whether descript information is received or not. If descript information is received, the USB module 124 determines that the external device 200 is a USB memory device and accordingly determines a data transmission mode. If the descript information is not received, the USB module 124 determines that the external device 200 is a different device other than the USB memory device and accordingly determines a charging mode. The USB module 124 informs the main controller 130 of the determined mode such that one of the power supply line and the data transmission is activated.

Although the USB controller 120 is divided into the USB charging module 122 and the USB module 124 in this embodiment, this should not be considered as limiting. That is, the USB controller 120 may perform both of the functions of the USB charging module 122 and the USB module 124 rather than being divided into the USB charging module 122 and the USB module 124. In this case, the USB controller 120 corresponds to a general USB IC.

The main controller 130 activates the power supply line or the data transmission line according to the type of external device 200 if the USB interface 110 detects connection with the external device 200. The main controller 130 comprises a USB reception module 132 and a control module 134.

The USB reception module 132 is adapted to receive data from the external device 200 through the USB interface 110. That is, if the data transmission line is activated by the control module 134, the USB reception module 132 receives data from the external device 200.

The USB reception module 132 receives data if the external device 200 is a USB memory device. The data received by the USB reception module 132 may be reproduced in the image display apparatus 100.

The control module 134 activates one of the data transmission line and the power supply line based on the mode determined by the USB controller 120 or the USB module 124. More specifically, the control module 134 activates the power supply line in the charging mode and activates the data transmission line in the data transmission mode.

Although the main controller 130 is divided into the USB reception module 132 and the control module 134 in this embodiment, this should not be considered as limiting. That is, the main controller 130 may perform both of the functions of the USB reception module 132 and the control module 134 rather than being divided into the USB reception module 132 and the control module 134. Herein, the main controller 130 or the control module 134 corresponds to a general controller of a TV. This means that the USB terminal can be controlled by the main controller 130 of the image display apparatus 100, i.e., the general controller of the TV.

FIGS. 2A to 2D are views of messages provided to a user during the process of operating the image display apparatus consistent with an exemplary embodiment of the present invention.

If the external device 200 is connected to the image display apparatus 100, the USB interface 110 detects connection with the external device 200 and the USB controller 120 or the USB module 124 determines the mode. After that, the main controller 130 or the control module 134 activates one of the power supply line and the data transmission line according to the determined mode.

If the USB controller 120 or the USB module 124 determines a charging mode, the main controller 130 or the control module 134 activates the power supply line. Prior to activating the power supply line, the main controller 130 provides a user with a message questioning whether to proceed with charging the external device 200.

Figure 2A:
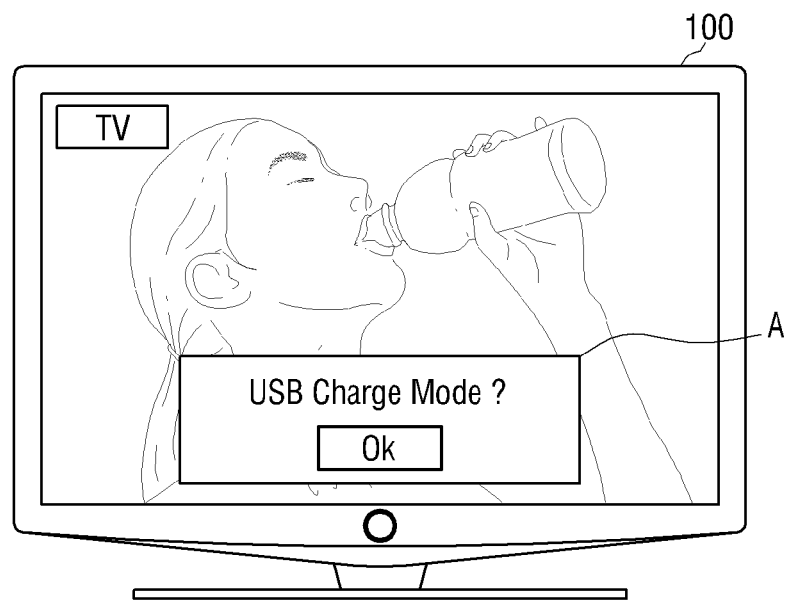
FIGS. 2A to 2D are views of messages provided to a user during a process of operating an image display apparatus consistent with an exemplary embodiment of the present invention.

As shown in FIG. 2A, through the on screen display (OSD), the main controller 130 or the control module 134 provides a user with a message questioning whether to proceed with charging the external device 200. For example, a message (A) "USB Charge Mode?" is displayed on the screen of the image display apparatus 100.

If the message (A) "USB Charge Mode?" is displayed on the screen of the image display apparatus 10, the user inputs whether to charge the external device 200 by manipulating a function key (not shown) provided on the image display apparatus 100 or a remote controller (not shown). Accordingly, the main controller 130 or the control module 134 activates the power supply line.

In FIG. 2A, prior to charging the external device 200 connected to the image display apparatus 100, the message (A) "USB Charge Mode?" is displayed to request user's approval. However, this procedure is not essential. That is, the charging operation may be performed without user's approval on the assumption that the user connects a different type of external device 200 other than the USB memory device to the image display apparatus 100 on purpose to charge the external device 200.

The message (A) "USB Charge Mode?" shown in FIG. 2A may be displayed either in case where a charging function is automatically set from function selection in the image display apparatus 100 and thus the image display apparatus 100 itself proceeds with charging upon recognizing connection with the external device 200, or where charging operation is performed at the request of a user using a function key provided on the image display apparatus 100 or a remote controller.

If a power is supplied to the external device 200 through the power supply line activated by the main controller 130 or the control module 134, the main controller 130 or the control module 134 informs the user that the external device 200 is in the process of being charged through the OSD.

Figure 2B:
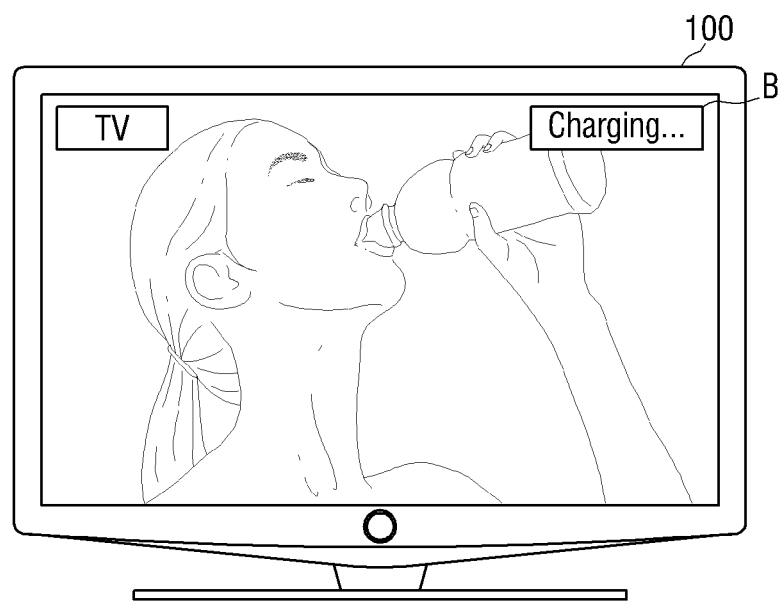

As shown in FIG. 2B, the main controller 130 or the control module 134 displays a message (B) "Charging . . . " on a side of the screen of the image display apparatus 100. The message (B) "Charging . . . " is displayed on an edge of the screen of the image display apparatus 100 not to hinder the user who watches a broadcast. The message (B) "Charging . . . " continues to be displayed until the USB controller 120 or the USB charging module 122 detects completion of the charging operation.

If the USB controller 120 or the USB charging module 122 detects completion of the charging operation, the main controller 130 or the control module 134 may display a message indicating that the charging operation is completed.

Figure 2C:
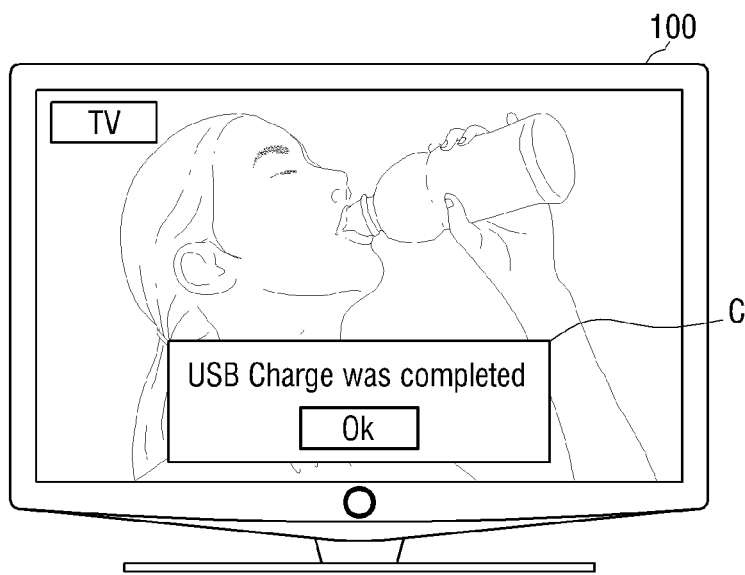

As shown in FIG. 2C, the main controller 130 or the control module 134 may display a message (C) "USB Charge was completed" through the OSD. If the message (C) "USB Charge was completed" is displayed when the user is watching a broadcast, the user recognizes that charging of the external device 200 is completed and disconnects the external device 200 from the image display apparatus 100.

The message (C) "USB Charge was completed" may include an OK button to request user's acknowledgement. If there is no response to the message (C) "USB Charge was completed" from the user, the main controller 130 or the control module 134 determines that the external device 200 connected to the USB interface 110 is in an abnormal state, and albeit shown, may display a message "Unidentified device is connected" on the screen of the image display apparatus 100 and then finishes the charging operation.

In FIGS. 2A to 2C, the message (A) "USB Charge Mode?" to start the charging operation the external device 200, the message (B) "Charging . . . " to indicate that the charging operation is in the progress", and the message (C) "USB Charge was completed" to indicate that the charging operation is completed are displayed. However, these messages are merely examples and should not be considered as limiting.

In the above, the operation of charging the external device 200, which is connected to the image display apparatus 100 in purpose to be charged, is performed while the user is watching a broadcast through the image display apparatus 100. However, it is possible to charge the external device 200 when the image display apparatus 100 is in a standby mode. Since the image display apparatus 100 is supplied with a standby power in the standby mode, it is possible for the image display apparatus 100 to detect connection with the external device 200.

If the external device 200 is connected to the image display apparatus 100 in the standby mode, the USB interface 110 detects connection with the external device 200 and the USB controller 120 or the USB module 124 determines the mode.

If the charging mode is determined, the main controller 130 or the control module 134 turns on the image display apparatus 100 and displays the message (A) "USB Charge Mode?" as shown in FIG. 2A to request user's approval. If the image display apparatus 100 is turned on, a broadcast signal corresponding to the channel the user lastly watched is output.

If the user decides to charge the external device 200 by pressing the OK button provided along with the message (A) "USB Charge Mode?", the main controller 130 or the control module 134 activates the power supply line and starts the charging operation. During the charging operation, the message (B) "Charging . . . " may be displayed as shown in FIG. 2B.

If completion of the charging operation is detected by the USB controller 120 or the USB module 124, the main controller 130 or the control module 134 allows the user to select whether to continue to watch the broadcast or whether to return to the standby mode because the image display apparatus 100 was turned on the standby mode.

Figure 2D:
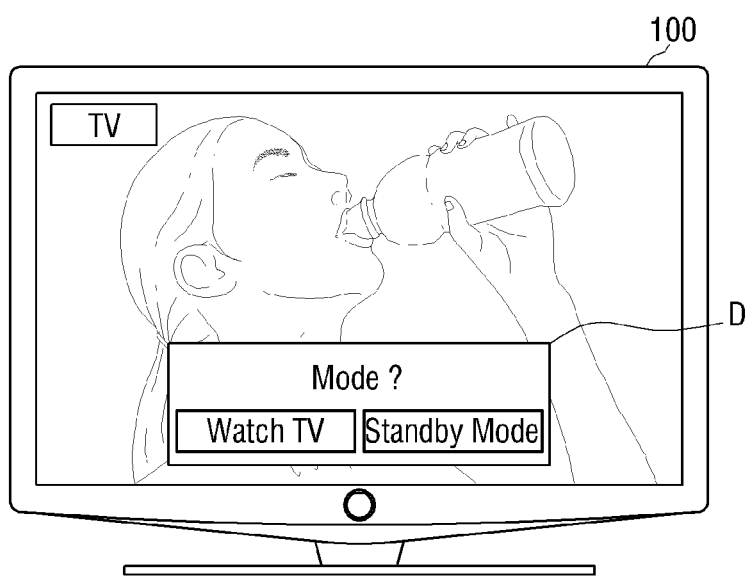

As shown in FIG. 2D, the main controller 130 or the control module 134 displays selection buttons to select "Watch TV" or "Standby Mode" along with a message (D) "Mode?". If the user selects one of the "Watch TV" or "Standby Mode", the main controller 130 or the control module 134 converts a current mode into a broadcast view mode or a standby mode.

Figure 3:
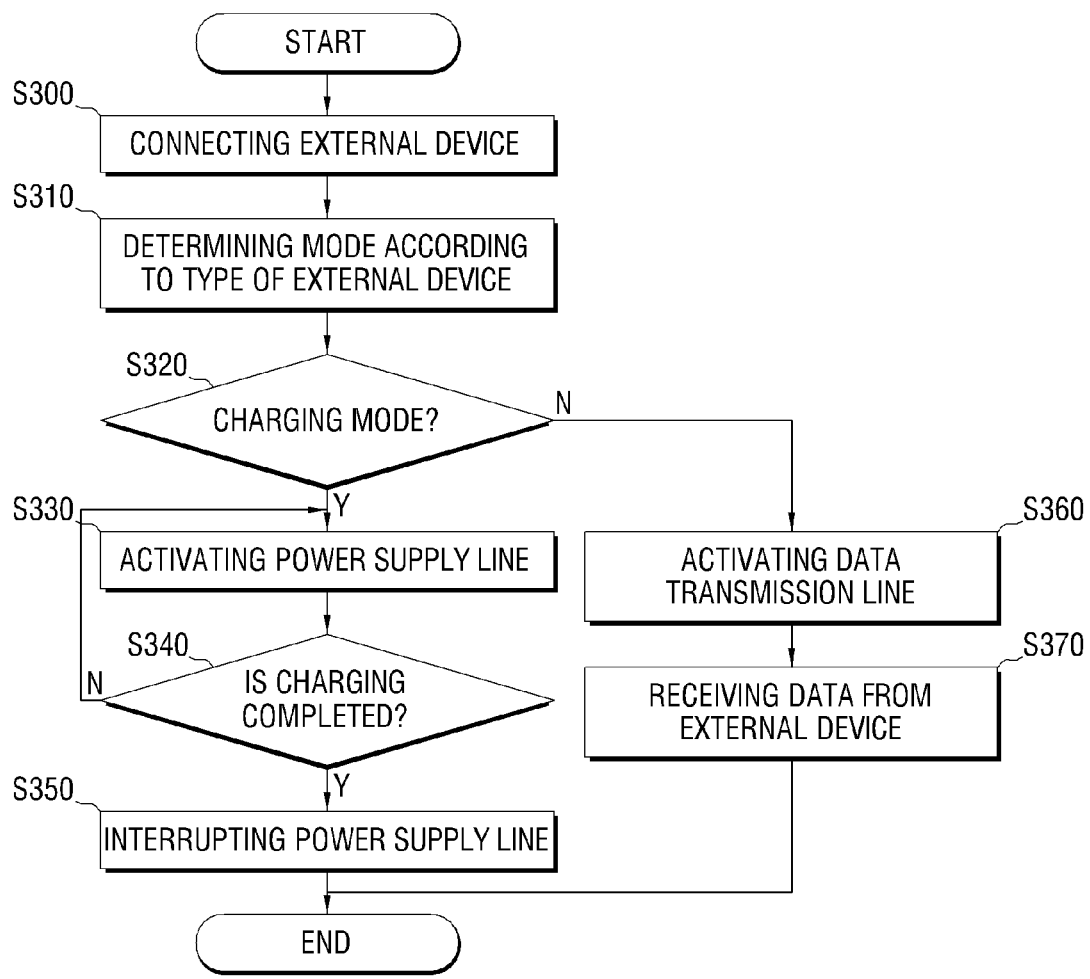
FIG. 3 is a flowchart illustrating an external device charging method of an image display apparatus consistent with an exemplary embodiment of the present invention.

FIG. 3 is a flowchart illustrating a method for charging an external device of an image display apparatus according to an exemplary embodiment of the present invention.

If the external device 200 is connected to the image display apparatus 100, the USB interface 110 detects connection with the external device 200 and controls the USB controller 120 to inform the main controller 130 of the connection with the external device (S300).

The USB controller 120 or the USB module 124 determines a mode according to whether descript information is received or not after the detection of connection with the external device 200. If descript information is received, the USB controller 120 or the USB module 124 determines the data transmission mode, and if descript information is not received, determines the charging mode (S310).

The main controller 130 or the control module 134 activates the power supply line or the data transmission line according to the mode determined by the USB controller 120 or the USB module 124.

If the charging mode is determined by the main controller 130 or the control module 134 (S320-Y), the main controller 130 or the control module 134 activates the power supply line (S330). If the power supply line is activated, the USB controller 120 or the USB charge module 122 monitors the progress of charging and detects completion of the charging operation. If completion of the charging operation is detected (S340-Y), the main controller 130 or the control module 134 interrupts the power supply line and finishes the charging operation (S350).

If the charging mode is not determined and instead the data transmission mode is determined (S320-N), the main controller 130 or the control module 134 activates the data transmission line (S360). The main controller 130 or the USB reception module 132 receives data from the external device 200 (S370).

FIG. 3 mainly explains operations performed in the image display apparatus 100. Therefore, the messages provided to the user as shown in FIG. 2A to 2D as each operation proceeds are not included in the flowchart of FIG. 3.

According to the method for charging the external device 200 shown in FIG. 3, if the external device 200 is detected as being connected through the USB by the image display apparatus 100, the power supply line or the data transmission line is activated according to the type of external device 200 such that the image display apparatus 100 selectively perform an operation of charging the external device 200 or receiving data from the external device 200.

As described above, the main controller 130 or the control module 134 activates the power supply line or the data transmission line according to the type of external device 200, making it possible for the image display apparatus to directly control the USB terminal.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image display apparatus having a function of charging an external device comprising:
   a universal serial bus (USB) interface which is operable to be connected to an external
   device through a power supply line and a data transmission line;
   a main controller which, if the external device is connected to the USB interface, activates one of the power supply line and the data transmission line according to a type of the external device; and
   a USB controller which determines the type of the external device according to whether information is received from the external device,
   wherein the information corresponds to device information of the external device, and wherein, if information is received from the external device, the main controller activates the data transmission line, and if the information is not received, the main controller activates the power supply line.

2. The image display apparatus as claimed in claim 1, wherein the main controller comprises:
   a control module which activates one of the power supply line and the data transmission line; and
   a USB reception module which, if the data transmission line is activated by the control module, receives data from the external device.

3. The image display apparatus as claimed in claim 1, wherein the USB controller comprises:
   a USB module which detects whether a power supplied to the external device exceeds a threshold value; and
   a USB charging module which detects whether a charging of the external device is completed after the power supply line is activated.

4. The image display apparatus as claimed in claim 3, wherein, if a completion of the charging of the external device is detected or if the power supplied to the external device exceeds the threshold value, the main controller interrupts the power supply line.

5. The image display apparatus as claimed in claim 3, wherein, if the power transmission line is activated in a standby mode and if a completion of the charging of the external device is detected, the main controller selectively converts a current mode into a broadcast view mode or the standby mode.

6. The image display apparatus as claimed in claim 1, wherein the image display apparatus is a television (TV) having a tuner.

7. A method for charging an external device, of an image display apparatus which is operable to be connected to the external device through a universal serial bus (USB) interface, the method comprising:
- if the external device is connected to the image display apparatus, determining a mode according to a type of the external device;
- if the determined mode is a charging mode, activating a power supply line to charge the external device, and if the determined mode is a data transmission mode, activating a data transmission line; and
- detecting a connection of the external device at the USB interface, and
- wherein the determined mode is the data transmission mode if information is received from the external device, and the determined mode is the charging mode if the information is not received.

8. The method as claimed in claim 7, further comprising receiving data from the external device if the data transmission line is activated.

9. The method as claimed in claim 7, further comprising, if the power supply line is activated, detecting whether a power supplied to the external device exceeds a threshold value and whether a charging of the external device is completed.

10. The method as claimed in claim 9, further comprising, if a completion of the charging of the external device is detected or if the power supplied to the external device exceeds the threshold value, interrupting the power supply line.

11. The method as claimed in claim 9, further comprising, if the power supply line is activated in a standby mode and if a completion of the charging of the external device is detected, selectively converting a current mode into a broadcast view mode or the standby mode.

12. The method as claimed in claim 7, wherein the image display apparatus is a TV having a tuner.

13. The image display apparatus as claimed in claim 1, wherein the device information of the external device is transmitted to the image display apparatus.

* * * * *